United States Patent Office 2,743,743
Patented May 1, 1956

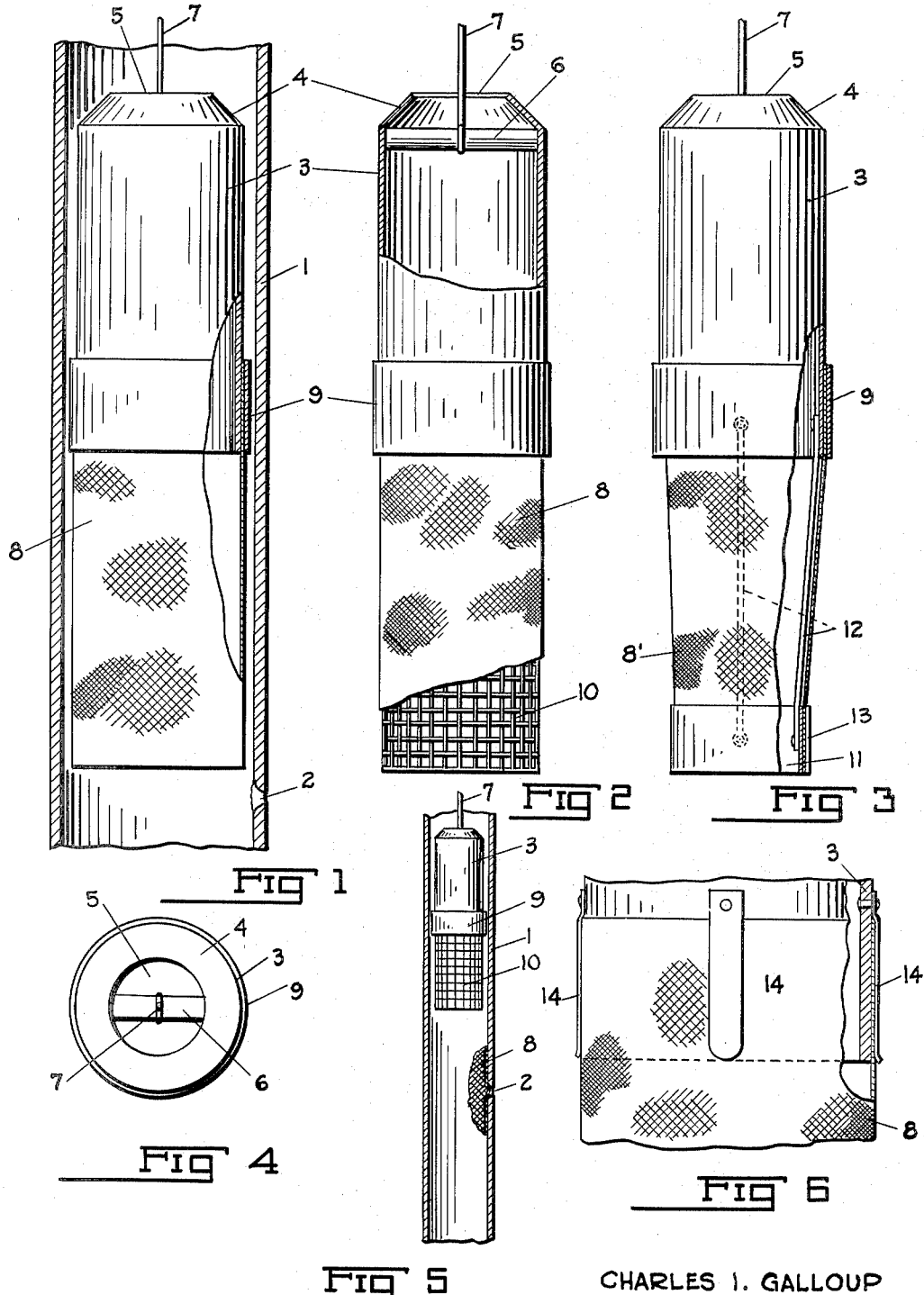

2,743,743

LEAK DETECTING AND SEALING DEVICE

Charles I. Galloup, Amarillo, Tex.

Application January 22, 1948, Serial No. 3,743

5 Claims. (Cl. 138—97)

This invention relates in general to leak detectors and particularly to a device for detecting leaks in gas or oil well casings, in pipe lines or in any conduit where a leak can be detected by pressure differentials.

Insofar as I am aware, until my invention, leak detecting devices and methods have been complicated, laborious, time and material consuming and consequently have been expensive to use.

In the operation of the majority of leak detectors employment is made of the pressure differential at the point of leak in one of the following methods:

First, to react on a pressure indicator to definitely locate the leak but not to seal it.

Second, to react on a detector and stop its movement at the leak to locate same, but which employs no means for sealing the leak.

Third, to react on a detector, stopping its movement and locating and sealing the leak, but breaking the seal upon removal of the device, and Fourth, to react on a detector, stop its movement, locate and seal the leak, and permit the removal of the detector without breaking the seal.

My invention falls in the latter category and the primary object of the invention is to provide a simply constructed and easily operated leak detector which will locate and temporarily seal a leak.

Another object of my invention is to provide in a leak detector of the class described, a removably secured element which will, upon detection of a leak, remain at the leak upon withdrawal of the detecting device.

Further objects and advantages as well as the construction and operation of my invention will be apparent by reference to the following description in connection with the accompanying drawings in which:

Fig. 1 is a vertical, elevational view of one form of my device in use at the point of leakage in a casing shown in section.

Fig. 2 is a similar view of a modified form of my invention, parts being broken away to better illustrate certain other parts.

Fig. 3 is also a vertical elevational view through a further modified form of my invention, with a fragmentary portion of the sealing element shown.

Fig. 4 is a top plan view of the leak detector, and

Fig. 5 is a vertical, elevational view of the device shown in Fig. 2, after the leak has been found and the device withdrawn from the area of the leak, with the sealing element in place over the leak.

Fig. 6 is an enlarged, fragmentary, elevational view showing a modified form of retaining means for the leak detecting and sealing element.

Referring now to the drawings by numerals of reference, 1 designates a casing which may be for gas or oil wells or may be any conduit used vertically, or used horizontaly as a pipe line, an opening designated by 2 indicating a leak in said casing or conduit.

The leak detector comprises a rigid shell 3 with conical upper portion 4 and opening 5. Extending transversely of the shell 3 and rigidly secured thereto is rod 6 to which may be secured the wire bail 7 carrying at its upper end (not shown) a suitable measuring device for determining the depth of the leak detector. As any suitable depth measuring device may be used satisfactorily with my invention I have not shown or specified any particular device but have provided for its attachment to my leak detector.

In the form shown in Fig. 1, the lower end of the shell 3 carries a skirt 9 preferably of fabric or the like which is held at its upper end to the shell by suitable retaining element 9 which may be a band of rubber or other elastic or resilient member or members. In this form there is no framework for the skirt which merely hangs from the shell and is retained in position by virtue of the pressure from above or by gravity.

In Fig. 2 the lower end of shell 3 carries a substantially rigid open framework 10 which may be formed of wire mesh or some similar openwork structure. The detecting and sealing element 8 covers framework 10 and may be held in place by holding member 9.

In Fig. 3, a reduced ring 11 may be provided and is spaced from the lower end of shell 3, a plurality of rigid members 12 connecting said ring 11 to the shell 3. The leak detecting and sealing element 8' is held in position at its upper end by retaining element 9 and at its lower end by retaining element 13. By making the ring 11 of smaller diameter than shell 3 the sealing element 8' is tapered providing for easy introduction into the casing and passing obstructions therein.

In the modification shown in Fig. 6, a plurality of resilient fingers 14 may be suitably secured to the shell 3 and are adapted to releasably hold the detecting and sealing element against the shell.

In the use of my device standard leak detecting practice is employed; that is, the well pressure is equalized so that the detector can be introduced into the casing, a suitable measuring device is secured to the detector which is lowered until a leak is encountered at which point the differential in pressure will force the detecting and sealing element 8 against the opening 2 which is causing the leak. This will stop the downward movement of the detector. A reading is taken on the measuring device and the detector is retrieved. The holding tension of the retaining member 9 is overcome by the force urging the detecting and sealing element 8 against the opening and said element 8 is disengaged from between the shell 3 and retaining member 9 and remains at the opening 2 to temporarily stop the leak.

Repair of the leaking section of casing can then be made by any number of suitable methods. I prefer to run a string of pipe and set a packer about 100 feet below the leak with the bottom of the pipe extending about 20 feet below the packer to insure stability. It has been the practice in leaking wells to run an entirely new string of pipe of lesser diameter than the original casing. This is very costly and results in a decrease in production. With my method, however, only a short string of pipe is used to seal the leak rather than upwards of 2000 feet as is usually the case.

From the foregoing it will be seen that I have provided a simple, easily constructed and easily operated leak detecting and sealing device for gas and oil well casing or for any conduit. It is obvious that changes in form, proportion and details of construction may be resorted to without departing from the spirit of my invention and I reserve all rights to such changes as come within the scope of these specifications and the claims which follow.

What I claim as new and desire to secure by Letters Patent is:

1. A casing leak detecting and sealing device comprising a supporting member, a pliable pressure responsive leak sealing element, a resilient means releasably securing said pressure responsive sealing element to the supporting member whereby said pressure responsive leak sealing element will remain in the vicinity of the leak and the supporting member will be detached from the leak sealing element when a leak is encountered and the supporting member is withdrawn from the casing, and a substantially rigid frame secured to the supporting member, the pressure responsive sealing element being positioned about the frame, said frame being withdrawable with the supporting member.

2. A casing leak detecting and sealing device comprising a supporting member, a pliable pressure responsive leak sealing element, a resilient means releasably securing said pressure responsive sealing element to the supporting member whereby said pressure responsive leak sealing element will remain in the vicinity of the leak and the supporting member will be detached from the leak sealing element when a leak is encountered and the supporting member is withdrawn from the casing, and a substantially rigid frame secured to the lower end of and depending from the supporting member, the pressure responsive sealing element being positioned about the frame, said frame being withdrawable with the supporting member.

3. A casing leak detecting and sealing device comprising a supporting member, a pliable pressure responsive leak sealing element, a resilient means releasably securing said pressure responsive sealing element to the supporting member whereby said pressure responsive leak sealing element will remain in the vicinity of the leak and the supporting member will be detached from the leak sealing element when a leak is encountered and the supporting member is withdrawn from the casing, and a cylindrical screen secured to the supporting member, the pressure responsive sealing element being positioned about the screen, said screen being withdrawable with the supporting member.

4. A casing leak detecting and sealing device comprising a supporting member, a pliable pressure responsive leak sealing element, a resilient means releasably securing said pressure responsive sealing element to the supporting member whereby said pressure responsive leak sealing element will remain in the vicinity of the leak and the supporting member will be detached from the leak sealing element when a leak is encountered and the supporting member is withdrawn from the casing, and a second support secured to and spaced from the first mentioned support, the pressure responsive element being detachably positioned between the shell and the support, and securing means on the support releasably holding one end of the pressure responsive sealing element thereto.

5. A casing leak detecting and sealing device comprising a supporting member, a pliable pressure responsive leak sealing element, a resilient means releasably securing said pressure responsive sealing element to the supporting member whereby said pressure responsive leak sealing element will remain in the vicinity of the leak and the supporting member will be detached from the leak sealing element when a leak is encountered and the supporting member is withdrawn from the casing, and a second support secured to and spaced from the first mentioned support, said second mentioned support being of smaller diameter than the first mentioned support, the pressure responsive sealing element being tapered and detachably positioned between the shell and the second mentioned support, and a resilient securing means on the supports releasably holding one end of the pressure responsive element thereto.

References Cited in the file of this patent

UNITED STATES PATENTS

| Re. 22,483 | Burt | May 23, 1944 |
| 768,477 | McKinley | Aug. 23, 1904 |
| 813,844 | Holliday | Feb. 27, 1906 |
| 1,110,959 | Niewiardowski | Sept. 15, 1914 |
| 1,342,927 | Ruthven | June 8, 1920 |
| 2,092,041 | Armentrout et al. | Sept. 7, 1937 |
| 2,233,930 | Witt | Mar. 4, 1941 |
| 2,416,441 | Grant et al. | Feb. 25, 1947 |
| 2,433,930 | Speer | Jan. 6, 1948 |

FOREIGN PATENTS

| 382,185 | Great Britain | Oct. 20, 1932 |